United States Patent

[11] 3,617,117

[72] Inventor Patrick Michael Powers
Arcadia, Calif.
[21] Appl. No. 795,846
[22] Filed Feb. 3, 1969
[45] Patented Nov. 2, 1971
[73] Assignee Bell & Howell Company
Pasadena, Calif.

[54] MOTION PICTURE PROJECTION SYSTEM
61 Claims, 10 Drawing Figs.
[52] U.S. Cl...................................................... 352/27,
352/40, 352/92, 352/125
[51] Int. Cl...................................................... G03b 23/06,
G03b 1/00
[50] Field of Search.......................................... 352/124,
125, 27, 40, 92; 242/55.16; 226/49

[56] References Cited
UNITED STATES PATENTS
1,843,650 2/1932 Schlicker...................... 352/125
2,298,925 10/1942 Bridges......................... 242/55.16
3,423,152 1/1969 Chaplais....................... 352/125

Primary Examiner—Louis R. Prince
Assistant Examiner—Denis E. Corr
Attorney—Christie, Parker & Hale ABSTRACT: A continuously rewinding motion picture projection system in which a pair of lengths of motion picture film, which define first and second halves of a film program, are arranged in reciprocal head-to-tail relation and are transferred simultaneously back-and-forth between a pair of reels upon which the film lengths are wound in bifilar fashion. Between the reels the film lengths each pass through a projection station which includes a projection lens system directed to a display screen common to both film lengths. The projection station is operable to project upon the display screen film information carried by the film length which, at that time, moves in a forward mode through the projection station. The film lengths are in the same state at the completion of display of the program as they were when the program display was commenced.

PATENTED NOV 2 1971
3,617,117
SHEET 1 OF 5
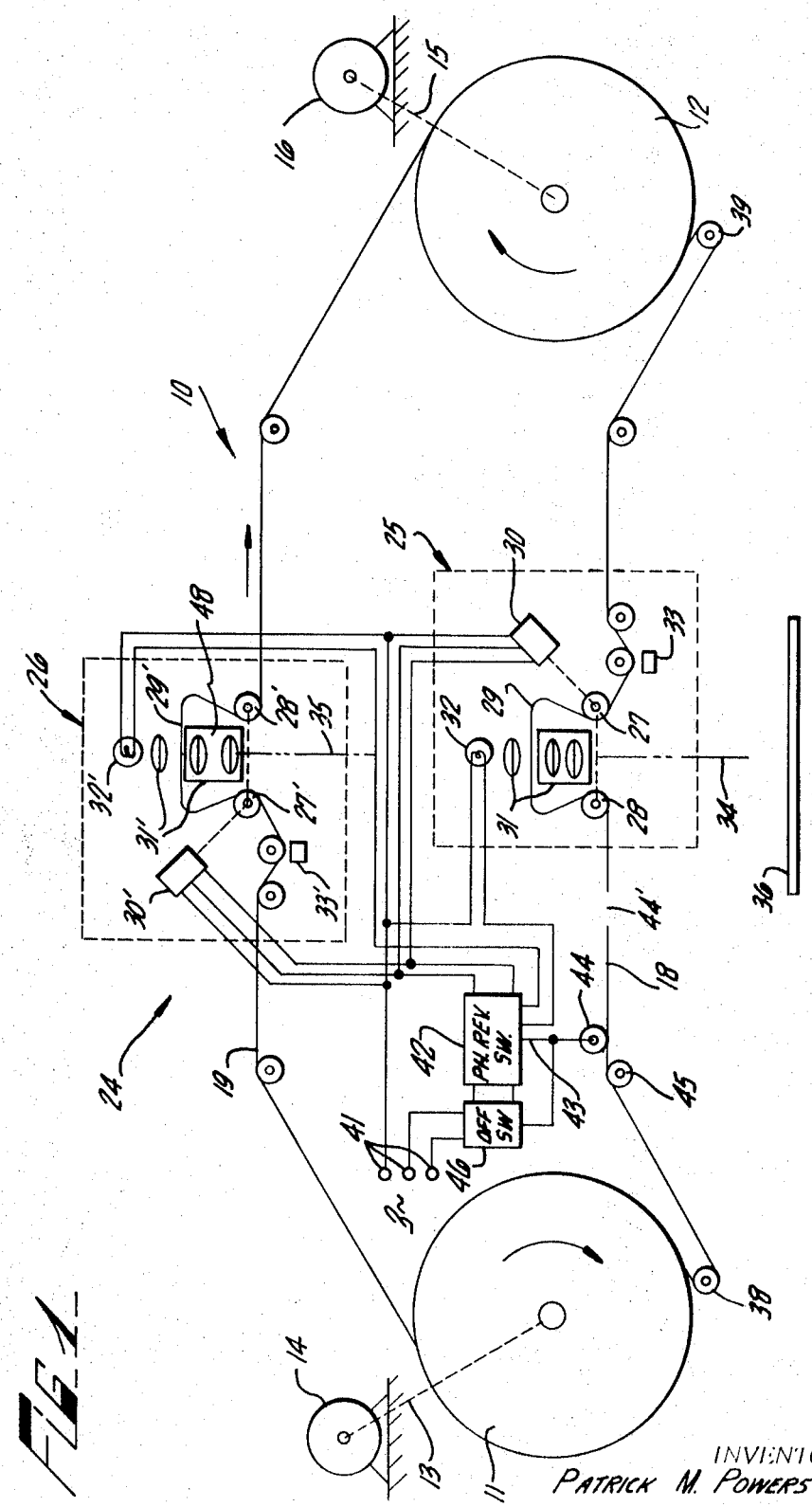
INVENTOR.
PATRICK M. POWERS
BY
Christie Parker & Hale
ATTORNEYS

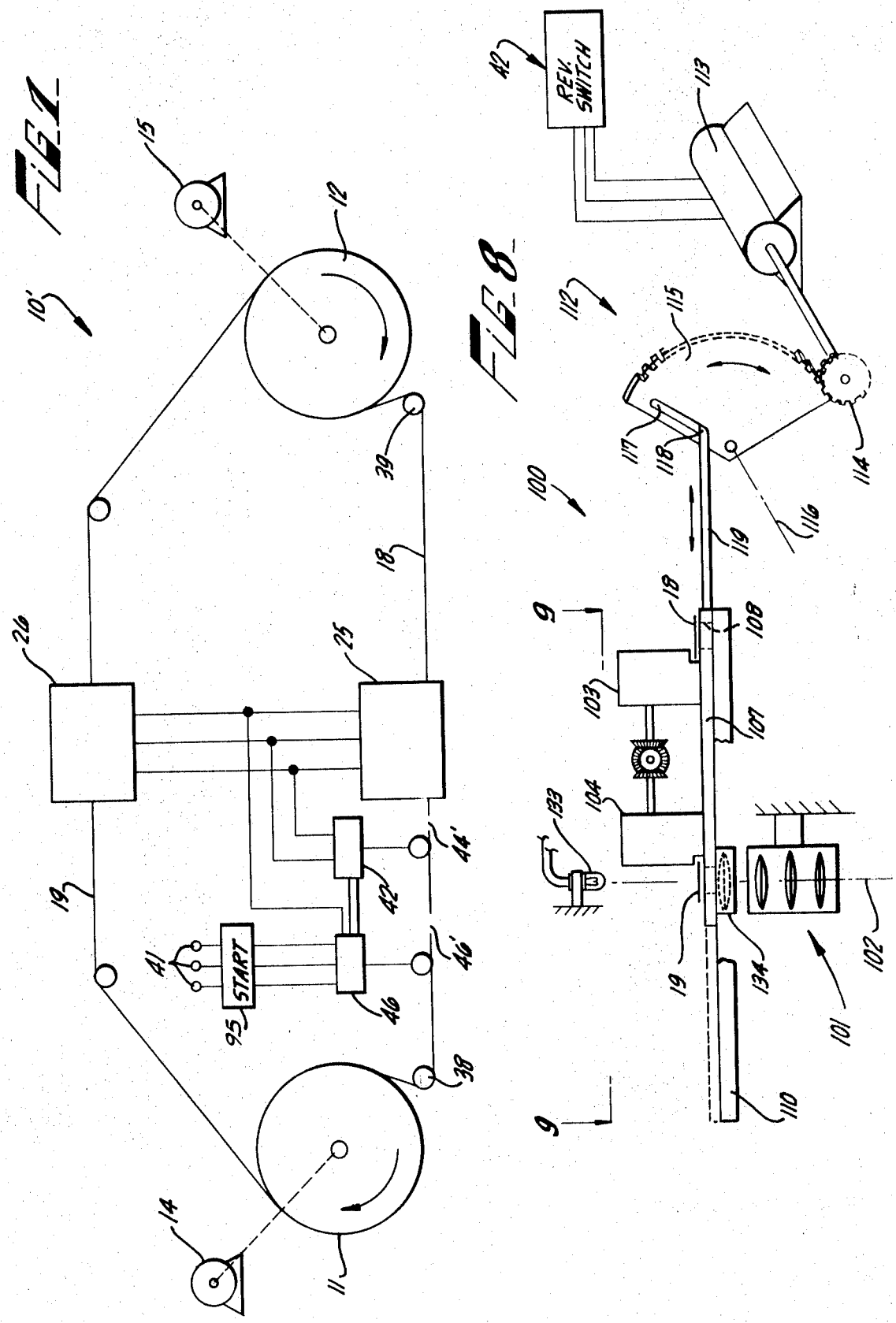

MOTION PICTURE PROJECTION SYSTEM

BACKGROUND OF THE INVENTION

1. Field of the Invention

This invention pertains to motion picture projection systems. More particularly, it pertains to a continuously rewinding system in which a pair of film lengths, arranged in reciprocal head-to-tail fashion, are shuttled through a projection station between a pair of supply/takeup reels where the lengths are wound in bifilar manner.

2. Review of the Prior Art

Motion picture entertainment of passengers aboard the aircraft of domestic and international air carriers is becoming commonplace. The presence of such entertainment, and the appeal thereof to individual passengers, may become a determinative factor in the choice by a passenger of which carrier to patronize. Also to be considered is the economic burden placed on the carrier by the cost of servicing the film entertainment system.

International air carriers cannot readily afford the economic burden associated with film entertainment systems which require servicing, typically rewinding of the film, at the completion of each showing of the film program. Servicing of the system requires the talents of skilled personnel which either are not available to international carriers at all desired geographic locations or are available in remote locations only at premium wages. Therefore, especially with respect to international carriers, it is desirable to provide film entertainment systems which require minimum servicing. Servicing requirements of film entertainment systems can be reduced significantly by the provision of systems in which film is effectively rewound automatically as the film program is presented; in systems with such capability, the "program turnaround time" is effectively zero.

One prior solution to the problem of "program turnaround time" is illustrated in U.S. Pat. No. 3,375,054; this patent does not pertain expressly to airline film entertainment systems, but it does illustrate the way film is handled in current airline systems having zero effective "program turnaround time." According to the disclosures of this patent, the entertainment system includes only a single reel upon which a continuous strip of film is coiled. Film is extracted from the center of the coil, led through a projection station, and returned to the outside of the coil. In such an arrangement, it is apparent that a given frame of film gradually moves from the outside of the coil slowly along an extensive spiral path to the inside of the coil, and that at the inside of the coil the film carrying such frame is moved laterally relative to the film defining the next outward turn in the coil as the film is extracted from the coil. Therefore, it is further apparent that the film slides on itself in moving from the outside to the inside of the reel coil. During such sliding movement, the film may become scratched so badly that the film rapidly becomes noticeably degraded, in terms of the image projected, unless dust and dirt are carefully eliminated from the reel area; dust and dirt control devices add to the cost of such film entertainment systems. Further, continuous film systems of the type illustrated in U.S. Pat. No. 3,375,054 presently can be made to operate successfully only with limited quantities of film. Also, film lubrication is difficult to maintain at levels adequate to keep film tension levels below those productive of film breakage. Further, in such arrangements the film tension level often becomes so great at the center of the film coil that the film pops off the core upon which the film is wound, thereby rendering the system inoperable.

U.S. Pat. Nos. 1,479,078 and 1,843,650 describe motion picture projection systems which have zero or near zero program turnaround time. These patents both describe projection systems in which two separate film lengths, defining serial portions of a film program, each has its own separate supply and takeup reels; that is, both systems use four reels and two film lengths. The reels are disposed in coaxial pairs, the reels in each pair being driven in opposite directions so that one film length moves in a forward mode between its reels while the other moves in a reverse mode between its reels. Each film length passes through its own projector mechanism. Thus, while one film is being displayed, the other is being rewound. In order that such systems may be useful, both reels in each coaxial pair must be rotated at the same angular velocity.

The projection systems described in U.S. Pat. Nos. 1,479,078 and 1,843,650 require the handling of multiple reels of film, are bulky, and involve complex mechanisms and mechanical interlocks. More importantly, these systems are sensitive to thickness differences between the two film lengths. As noted, the coaxial reels in the systems are positively driven at equal rates. Thus, if one film is thicker than the other, such film will be reeled on its takeup reel faster than the other film, and the difference in reeling rates will increase as the film on the takeup reel increases. Therefore, if any significant quantities of film are used in these systems, complex control mechanisms must be used, where the films are not of equal thickness, to prevent such differential reeling rates, or else the tension level in the thicker film will rapidly develop to a value adequate to break the film.

U.S. Pat. No. 1,801,061 describes the provision of two films disposed in reciprocal head-to-tail relation on four reels arranged in two coaxial pairs of reels such that one film is being rewound upon its supply reel while the other is being moved to its takeup reel; all four reels are disposed in a housing which must be manually turned end for end relative to a single projection mechanism. This arrangement also suffers from the same disadvantages of bulkiness and film thickness sensitivity as the arrangements reviewed immediately above. The requirement for manual handling is a major element of the problem which this invention overcomes.

U.S. Pat. Nos. 1,253,796 and 1,893,698 describe bifilar winding upon a supply reel of two unexposed lengths of film, each of which bears a color-sensitive emulsion layer different from the emulsion layer borne by the other film. These patents describe motion picture cameras rather than projection systems, and to the extent these patents pertain to projection systems they describe simultaneous display of both films which are simultaneously moved in a forward mode through an appropriate projection mechanism. These arrangements do not purport to solve, and do not suggest a solution to the problem of a motion picture projection system having zero program turnaround time.

U.S. Pat. Nos. 3,240,329 and 3,378,328 described bifilar winding upon a pair of reels of a film and a magnetic sound tape defining, respectively, the visual and audio aspects of a composite presentation. The film and the tape are moved simultaneously in a forward mode through separate playback devices. This arrangement also makes no contribution to the problem of zero program turnaround time for motion picture displays.

Relative to magnetic sound recordings, it is known to record two tracks of stereo sound information in one direction on a length of magnetic recording tape, and to record two additional stereo sound tracks in the opposite direction on the same tape. By analogy to these practices, it is apparent that a motion picture presentation having zero program turnaround time could be provided by printing corresponding halves of a film program in opposite directions on a common length of film, the first half of the program being shown as the film moves in one direction through a projector and the second half being shown while the film moves in the opposite direction simultaneously with a film rewinding operation. It is apparent, however, that such a solution to the problem of program turnaround time requires the development and use of presently unavailable film printing apparatus and projection mechanism. Further, this solution to the problem of program turnaround time requires the use of film prints of limited utility. In sum, then, such a solution is prohibitively expensive. The present invention, on the other hand, uses conventional film prints.

SUMMARY OF THE INVENTION

This invention provides an economic, simple, compact, reliable and efficient film entertainment system, especially suitable for use in commercial passenger aircraft, in which the program turnaround time is effectively zero and in which maximum use is made of commercially available film printing devices and projection mechanisms. The present system does not suffer from any of the disadvantages presented by the arrangements described in the prior patents discussed above or in the double-track, single-film arrangement considered above as an alternate solution to the problem of program turnaround time. The system is arranged so that film is not scratched or otherwise unnecessarily degraded during use of the system. The system may be used repeatedly with a single load of film to project motion picture information having the same optical and sound quality as conventional projection systems. The system is useful with conventional film of any size desired. The system is not sensitive to differences in film thickness and requires manual servicing operations only when a change in the film program is desired.

In broad terms, this invention provides a novel motion picture record which includes first and second lengths of motion picture film defining, respectively, the first and second halves of a motion picture program of desired content, and a reel. The two lengths of film are cowound in bifilar fashion upon the reel and are disposed relative to each other so that the head end of one film length and the tail end of the other film length are adjacent each other at the reel core.

The invention also provides a motion picture projection system of which the improved record is a component and which provides one of two reels in the system between which the two film lengths are passed along separate film paths via appropriate guide means. The film lengths are cowound in bifilar fashion upon both reels. Between the reels, the film lengths pass through projection means which includes projection lens means. Means are provided for driving the film lengths simultaneously back and forth between the reels. The projection system also includes means for operatively associating the projection lens means with the film length which moves in a forward mode through the projection means for display of film information carried by such film length.

As used herein with reference to the present invention, the terms "program" and "motion picture program of desired content" apply to a film presentation consisting of a single feature length motion picture with or without short subject films, and also to a film presentation comprised of two feature length motion pictures with or without short subject films. It is believed that the context wherein these terms are used in the following description will make it clear which or both of these meanings is appropriate.

DESCRIPTION OF THE DRAWINGS

The above-mentioned and other features of this invention are more fully set forth in the following detailed description of selected embodiments, including a presently preferred embodiment, of the invention, which description is presented with reference to the accompanying drawings wherein:

FIG. 1 is a schematic view of a film projection system according to this invention;

FIG. 7 is a modification of the system shown in FIG. 1;

FIG. 8 is an elevation view of a portion of another projection system;

DESCRIPTION OF THE ILLUSTRATED EMBODIMENTS

Figure 3:
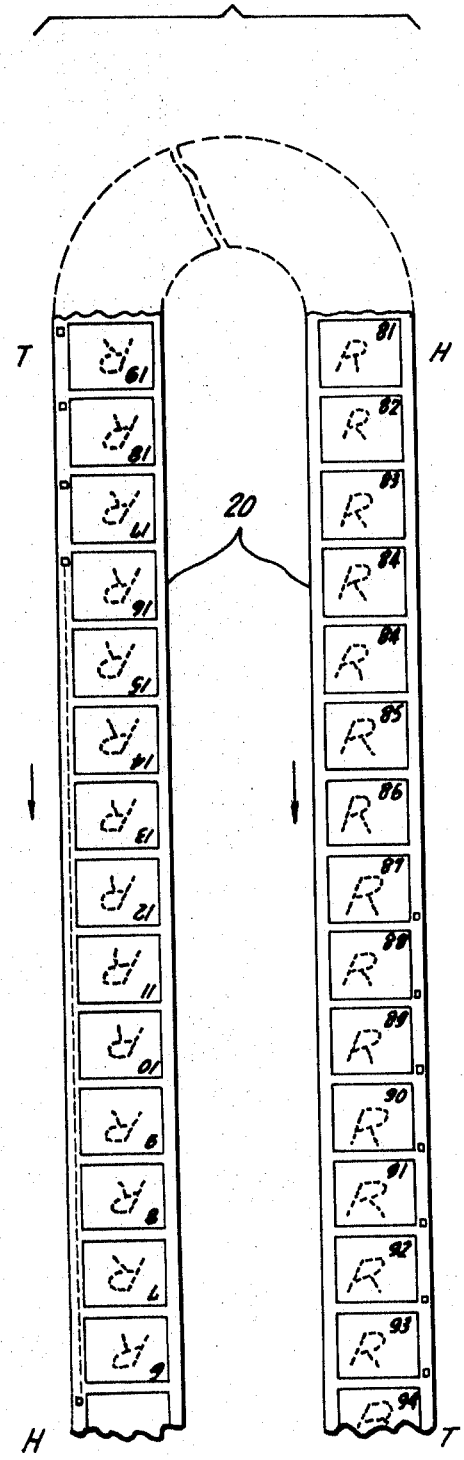
FIG. 3 illustrates bifilar film winding.

Projection system 10, shown in FIG. 1, includes a pair of film storage reels 11 and 12. Each of the reels functions simultaneously, during operation of the system, both as a supply reel and as a takeup reel, as will be apparent from the following description. Reel 11 is mounted to a shaft 13 of a motor 14, and reel 12 is mounted to a shaft 15 of a motor 16. Reels 11 and 12 are shown in FIG. 1 to be mounted for rotation about separate axes, but it is within the scope of the invention that the reels may be mounted coaxially. The reels are driven at appropriate angular velocities by their respective drive motors. Preferably the motors per se are operated synchronously, each motor being coupled to the adjacent reel by a strip-tension-responsive control mechanism substantially in accord with the disclosures of U.S. Pat. No. 3,398,914. These motors preferably are not used to drive film through the system; instead, the reels are rotated only to supply and take up film as needed during operation of the system.

Figure 2:
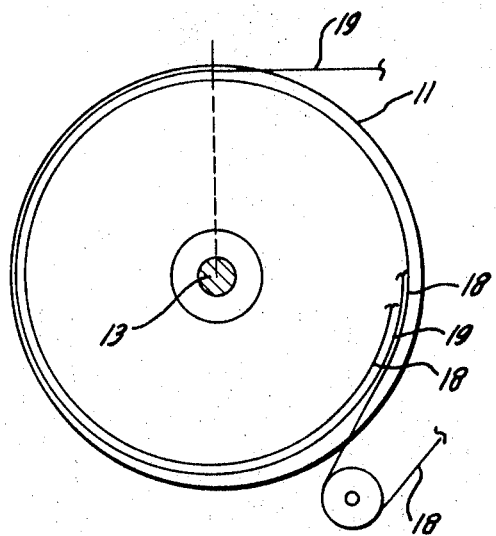
FIG. 2 is an enlarged elevation view showing the bifilar film reeling used in a projection system according to the invention.

Two separate lengths 18 and 19 of motion picture film are engaged with each of the reels and extend between the reels along separate film paths. Film lengths 18 and 19 are of essentially equal length and are wound in bifilar fashion on the reels. That is, to accomplish bifilar winding, the film lengths are cowound on the reels so that a given turn of film length 18, for example, lies between adjacent turns of length 19 about the reel core, as shown in FIG. 2. The lengths preferably are cowound on the reels in overlying or bifilar relation with their emulsion sides facing in a common direction relative to the reel axis so that the emulsions of the films are not in contact with each other while the film lengths are coiled on the reels; this arrangement prevents the films from sticking to each other under conditions of high humidity, protects the emulsions, and prevents degradation of the visual images produced by the system during repeated displays of the information carried on the film lengths.

Lengths 18 and 19 define respective halves of a motion picture program of desired content. If the desired content of the program includes two feature-length motion pictures, as may be desired where system 10 is used in a commercial passenger aircraft, each film length is sufficiently long to define an entire feature film. The film lengths are disposed in reciprocal head-to-tail relation to each other between the reels. That is, if each film length is 10,000 frames in length (such a length being purely arbitrary and being mentioned only for the purposes of example), frame No. 1 of length 18 and frame No. 10,000 of length 19 are adjacent each other at reel 11, for example, and frame No. 10,000 of length 18 and frame No. 1 of length 19 are adjacent each other at reel 12.

The effect of the bifilar wound, reciprocal head-to-tail arrangement of film lengths 18 and 19 is illustrated in FIG. 3 relative to a film length 20. Assume that length 20 is 100 frames long and is folded upon itself between frames 50 and 51 so that frames 50 and 51 overlie each other and frames 1 and 100 overlie each other and so that the emulsion surfaces of both halves of the film length face in the same direction. Assume further that the folded film length is then moved linearly past a given point in such a manner that frames 1–50 pass serially past such point; during such movement, the portion of length 20 defining frames 1–50 is moving in a forward mode or direction past the point, and the portion of the film length which defines frames 51–100 is moving in a reverse mode or direction past the same point. Such arrangement of film length 20 is directly akin to the arrangement of film lengths 18 and 19 on reels 11 and 12 and to the manner in which the lengths move along their separate paths between the reels.

The bifilar wound, reciprocal head-to-tail arrangement of two film lengths of essentially equal length between two film storage reels is common to all projection systems according to this invention. It is preferred, but not required, that the film lengths be wound so as to have their emulsion sides facing in a common direction relative to the reel axes. It is also preferred that any system according to this invention, once threaded with film, be kept threaded; leader film may be used to maintain system threading in the event it is desired to change the film program.

Projection means 24 are located in system 10 along the paths of film lengths 18 and 19 between the film reels. The projection means of system 10 includes two projectors 25 and 26 associated with film lengths 18 and 19, respectively. Projector 25 includes a pair of film drive sprockets 27 and 28 located at opposite ends of a shuttle loop 29, a reversible motor 30 for rotating the sprockets and a conventional film advance mechanism (not shown), a projection lens system 31, a projection lamp 32, and an audio pickup head 33 for cooperating with a sound track carried by film length 18; projector 26 includes corresponding components 27'–33'. Projection lens system 31 and lamp 32 are aligned along an optical axis 34 of projector 25. Lens system 31' and lamp 32' of projector 26 are aligned along an optical axis 35. These optical axes are directed to a single display screen 36 which is common to the projection means for both film lengths.

Projection system 10 is illustrated pursuant to the assumption that film length 18 moves through projector 25 in a forward mode when reel drive motors 30 and 30' are operated to transfer film through the system from reel 11 to reel 12. Accordingly, audio pickup head 33 is located along the path of film length 18 between lens system 31 and reel 12, whereas audio pickup head 33' is located along the path of film length 19 between lens system 31' and reel 11.

Projectors 25 and 26 preferably are essentially conventional, commercially available motion picture projectors and are mounted backwards (i.e., in back-to-back relation) relative to each other between reels 11 and 12 to obtain the aforementioned transposition of the audio pickup heads relative to the optical axes of the projectors. Such reverse mounting of the projectors also places projector 26 in the proper relation to he marginal sprocket holes of film length 19, as will be seen below.

Assume that film length 18 is wound "outside" of film length 19 on reel 11, as shown in FIG. 2, and both film lengths are essentially fully wound on reel 11. If the films are of equal length, i.e., contain equal numbers of frames, and are connected to reel 11 at a common location on the circumference of the reel core, the outer end of length 18 will be displaced circumferentially around the reel from the end of length 19; the amount of such displacement will be determined by the length of film lengths 18 and 19. To avoid the use of a slack film takeup mechanism in system 10, or to minimize the size of any slack film takeup mechanism provided in the system, film length 18 is effectively removed from reel 11 at a point which is effectively displaced around the reel from the point at which length 19 becomes tangent to film wound on the reel by an amount equal to the apparent difference between the lengths of film 18 and 19 when both films are essentially fully wound upon reel 11. Thus, as shown in FIG. 2, film length 18 is taken from or supplied to reel 11 over a roller 38 which is displaced around the reel from the location where the wrap of length 19 around the reel commences. Roller 38 is located relative to reel 11 in such a position that one-half the apparent difference in length between films 18 and 19 is adjusted adjacent reel 11 by fixed structure rather than by a movable roller or rollers located along the path of film length 18. The remaining half of the apparent difference in length between films 18 and 19 on reel 11 is adjusted for by a roller 39, similar to roller 38, located adjacent reel 12. Thus, the apparent difference in length between strips 18 and 19 is distributed between reels 11 and 12 in proportion to the quantities of film wound on these reels.

Where rollers 38 and 39 are used, such rollers being mounted for rotation about fixed axes, it is important and desireable that the film be under essentially equal tension when initially wound onto the appropriate reel. Variations in tension between the film strips during the initial loading of a reel will produce a variation in the apparent length difference between the films as wound upon the reels, and also in the amount of film present in the system between the reels.

If film lengths 18 and 19 are taken from and supplied to the reels at common points on each reel, it becomes necessary to use a slack-absorbing mechanism somewhere in the path of at least film length 18, for example, to accommodate the change in the apparent difference in film strip length during operation of the system, otherwise film 18 will become too slack somewhere along its path or film 19 will become too taut along its path of movement.

It was noted above that projector motors 30 and 30' are reversible motors. Preferably these motors are three-phase synchronous motors which are connected in parallel to power input terminals 41 via a phase-reversing switch 42, but any type of motor may be used, the principal concern being to drive the films through the system at equal rates. The switch includes an actuating plunger 43 which mounts a sensing roller 44 engaged with film length 18. The sensing roller normally rides along the surface of the film adjacent a guide roller 45 for film length 18. Adjacent each end of film 18, an aperture 44' is provided through the strip. The roller detects these apertures and drops slightly through an appropriate aperture, thereby to move plunger 43 and operate switch 42, causing motors 30 and 30' to reverse before all film is removed from reel 11 or reel 12, as appropriate. Switch 42 also controls the direction in which reel drive motors 14 and 16 are operated. If desired, a system shutoff switch 46 may also be controlled by plunger 43, as shown in FIG. 1, especially where each of film lengths 18 and 19 defines a complete film program rather than a corresponding half of a complete film program. Reversal and shutoff of the system may be controlled by only one of the film lengths since the bifilar relation of the film lengths on the reels automatically slaves gross motions of each film length to those of the other film length.

Projection lamps 32 and 32' are controlled so that the projector which is operated in a forward mode during operation of the system has its projection lamp illuminated. In system 10, energization of lamps 32 and 32' is controlled by phase-reversing switch 42, as shown in FIG. 1.

The operation of system 10 may be best understood from a consideration of system 10' (FIG. 7) which includes a system shutoff switch 46 separate from phase-reversing switch 42 and which operates in response to the sensing of an aperture 46' positioned in film 18 adjacent the head end thereof so as not to operate the phase-reversing switch; in such a case, film lengths 18 and 19 define the first and second halves, respectively, of a complete feature length film, for example. When operation of such a system is begun, essentially all the film in the system is stored on reel 11, and only so much film is extended to reel 12 as is necessary to make a connection to reel 12. To initiate operation of the system, a system start switch 95, preferably fitted with a time delay HOLD function to permit the reversing switch and shutoff switch sensing rollers to clear their respective film apertures, is operated. Projector 25 is then operated in a forward mode (with lamp 32 illuminated) and projector 26 is operated in a reverse mode with lamp 32' dark. During this period, the information carried by film length 18 is projected upon display screen 36. Just before reel 11 is emptied of film, roller 44 senses an aperture 44' adjacent the tail end of film length 18 and switch 42 is operated to reverse projector motors 30 and 30' as well as reel drive motors 14 and 16. The connection of switch 42 to the reel drive motors is not shown to simplify the illustration of FIG. 7, but is similar to the connection of this switch to the projector motors. When the projector motors are reversed, lamp 32' is illuminated and lamp 32 becomes dark. The second half of the film program is then presented on display screen 36 by projector 26 as film is transferred from reel 12 back to reel 11. As the head end of film length 18 approaches reel 11, the sensing rollers of the reversing switch and the system shutoff switch detect the apertures 44' and 46' with which they cooperate, and the system is turned off. The system is then in exactly the same condition as it was when it was placed into operation.

Where each film length defines a film program which is complete in itself, the system is shut off as the tail end of length 18 approaches reel 12, and also as the head end of the length approaches reel 11. It is apparent, therefore, depending upon the content of the information carried by film lengths 18 and 19, that the invention when arranged as system 10' can be used to show the same program during an airline flight from destination A to destination B as on a return flight from destination B to destination A, or the invention when arranged as system 10 can be used to show a program during a flight from destination A to destination B which is different from the program presented during a return flight from B to A.

Motion picture film and commercially available motion picture projectors are cross-standardized for obvious reasons. If a length of motion picture film is viewed from its emulsion side with the image in any given frame erect, film frame numbers increase proceeding from the top to the button of the length and, in the case of at least 8 mm. and 16 mm. film, the film sprocket apertures are formed along the right margin of the film. Projectors are arranged so that the film is passed through the projector with its emulsion side disposed toward the projection lamp, and so that the film advance mechanism of the projector engages the film sprocket holes adjacent a projector baseplate 47 (see FIG. 4, for example). In FIG. 3, film length 20 is viewed from its emulsion side.

It was mentioned above that projectors 25 and 26 are essentially identical, preferably commercially available projectors which are mounted reversed relative to each other. The reversed relative mounting of these projectors automatically corrects for the fact that the film sprocket holes of film length 19 are on one side of the path of length 19 and that the sprocket holes of length 18 are on the opposite side of the path of length 18. To correct for the inversion and transposition of the images of film length 19 relative to those of length 18, the lens system of projector 26 includes a lens 48, not present in the lens system of projector 25, which perverts, i.e., transposes and inverts, the image which otherwise would be presented by this projector on display screen 36.

Figure 4:
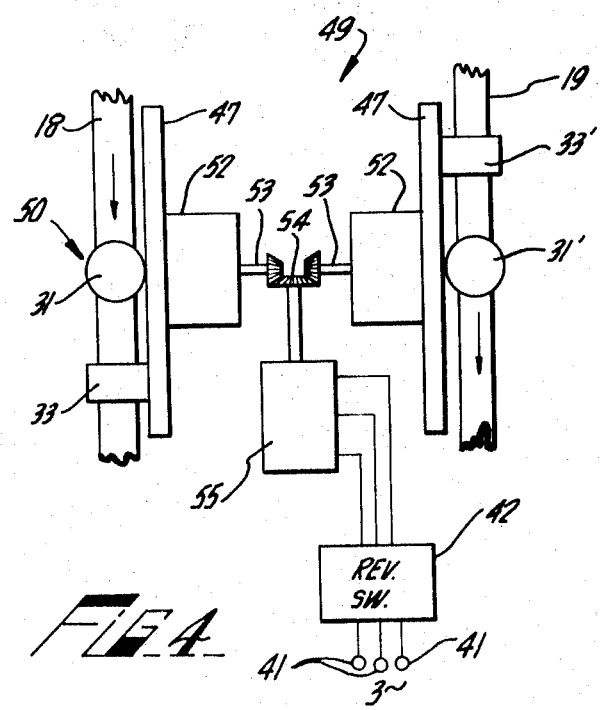
FIG. 4 is a fragmentary elevation view of another projection system.

FIG. 4 shows a portion of a projection system 49 having two projectors 50 and 51, each of which includes a conventional film advance mechanism 52 having a drive shaft 53. Each shaft 53 is coupled, via a bevel gear mechanism 54, to a reversible drive motor 55 which has its mode of operation controlled by phase-reversing switch 42. FIG. 4 also illustrates how commercially available projector mechanisms may be mounted reversed relative to each other in cooperation with film lengths 18 and 19 to achieve the results described above.

Figure 5:
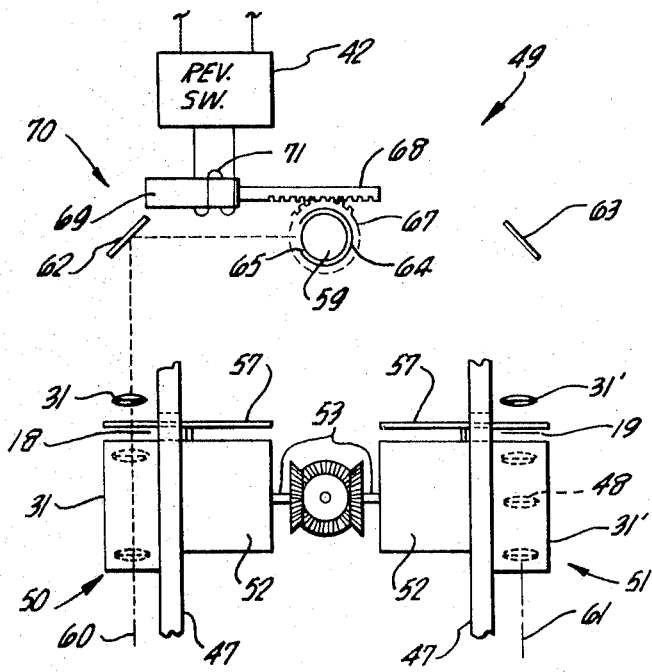
FIG. 5 is a fragmentary plan view of the projection system shown in FIG. 4.

FIG. 5 is another view of the portion of projection system 49 shown in FIG. 4. FIG. 5 shows that each of projectors 50 and 51 has a shutter plate 57 which is rotated in response to rotation of shaft 53 for the appropriate projector. Further, FIG. 5 illustrates that projectors 50 and 51 may have a common projection lamp 59 as well as a common reversible drive motor. Projectors 50 and 51 have optical axes 60 and 61, respectively, aligned essentially parallel to each other. Lamp 59 is disposed in the plane of the optical axes behind and centrally of the projector base plates between a pair of mirrors 62 and 63 which deflect rearward extensions of the projector optical axes to the filament of lamp 59. Preferably mirrors 62 and 63 and lamp 59 are aligned in a straight line. Lamp 59 is disposed within and coaxially of a rotatable, cylindrical, internally reflective light mask 64 having a window 65. The light mask is mounted on a gear 67 which cooperates with a reciprocable rack 68 connected to the armature 69 of a linear action solenoid 70. The solenoid has a winding 71 the energization of which is controlled by phase-reversing switch 42. The stroke of the solenoid armature and the rack, and the configuration of gear 67 are selected so that mask 64 is rotated 180° about the lamp when the phase reversing switch is actuated to alter the condition of energization of solenoid winding 71.

The reversing switch and the solenoid of projection system 49 are arranged so that when projector 50 is operated in its forward mode, the mask is positioned to illuminate only the lens system of this projector via mirror 62. Conversely, when projector 51 is operated in its forward mode, its lens system, but not the lens system of projector 50, is illuminated by lamp 59 via mirror 63. In all other significant respects, system 49 is in accord with the foregoing description and provides the same features and advantages as does system 10 shown in FIG. 1.

Figure 6:
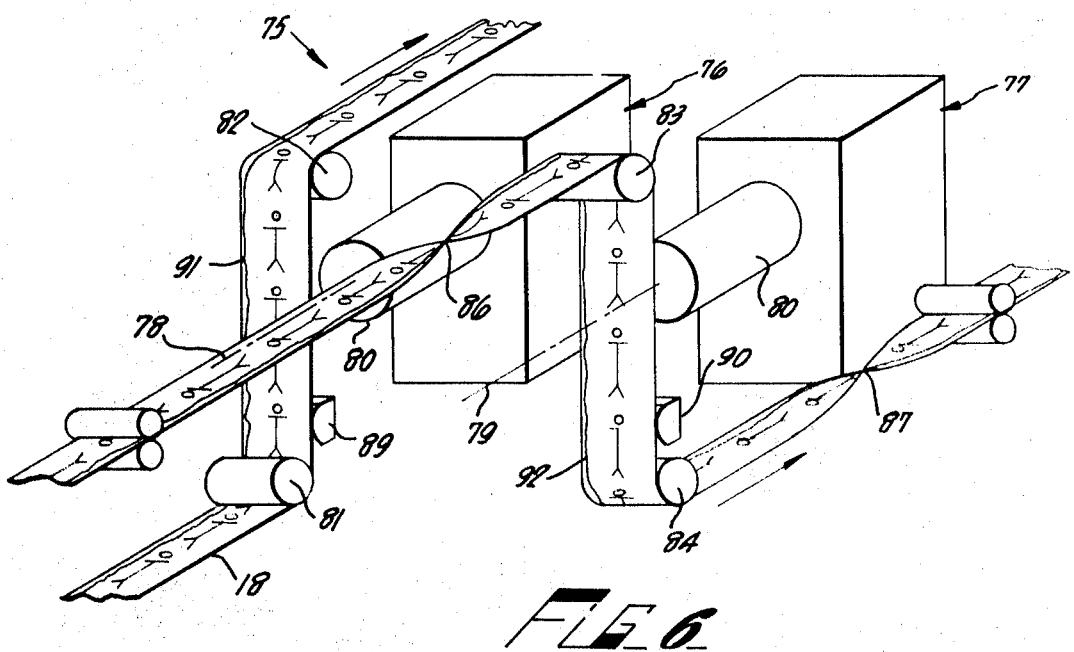
FIG. 6 is a perspective view of the projection station and film orientation in a preferred projection system according to this invention.

FIG. 6 illustrates the significant aspects in which a projection system 75, the presently preferred embodiment of this invention, differs from systems 10 and 49 described above; it will be understood that the depiction of FIG. 6 is grossly simplified for clarity and ease of illustration of the pertinent features of system 75.

Projection system 75 includes two projections 76 and 77 which are aligned substantially parallel to each other, in erect nonreversed relation to each other, so that their optical axes 78 and 79, respectively, are directed to a common display screen. Each of projectors 76 and 77 preferably is a commercially available motion picture projector and has its own reversible shutter and film advance mechanism drive motor, as is the case with system 10 described above. The projectors may have their own separate projection lamps or, if desired, they may share a common projection lamp as is the case in system 49. Also, each projector includes a projection lens system 80 which is identical to the lens system of the other projector; in this respect, system 75 is different from systems 10 and 49.

As in projection systems 10 and 49 described above, projectors 76 and 77 comprise projection means located along the paths of film lengths 18 and 19 between storage reels 11 and 12. Film lengths 18 and 19 are wound in bifilar fashion on these reels in the manner shown in FIGS. 2 and 3. The paths along which film lengths 18 and 19 move are arranged so that, regardless of the direction in which film is transferred between reels 11 and 12, the emulsion sides of both film lengths face the projection lamps, and the image projected on the display screen is a right-reading erect image, even though the projectors and their lens systems are identical.

Assume that the system is operated to transfer film from reel 11 to reel 12, such that projector 76 for film length 18 is operated in a forward mode. Film 18 is moved across optical axis 78 from bottom to top (such orientation being specified with reference to FIG. 6), and film 19 is moved from top to bottom across optical axis 79. That is, film 18 approaches projector 76 from reel 11 below optical axis 78. At the projector, film 18 passes around a guide roller 81 and then upwardly across the optical axis to another guide roller 82 from which the film moves above the optical axis to reel 12. Film 19, however, approaches projector 77 from above optical axis 79. At projector 77, the film passes around a guide roller 83, downwardly across the optical axis of the projector, and then around another guide roller 84 from which the film length moves below axis 79 to reel 12. Therefore, regardless of which projector is illuminated, the image presented on the display screen is an erect image.

So that the image projected on the display screen by projector 77 will be a right-reading image, and so that the sprocket holes of film length 19 will be on the proper side of optical axis 79 to be engaged by the film advance mechanism of projector 77, film length 19 is given a 180° axial twist 86 in one direction between reel 11 and the projector and a 180° axial twist 87 in the opposite direction between the projector and reel 12.

It will be understood that twists 86 and 87 need not be provided in film 19 if such film is wound on reels 11 and 12 so that its emulsion side engages the emulsion side of film 18. This expedient is not preferred, however, for the reasons set forth above.

Projectors 76 and 77 include audio pickup heads 89 and 90, respectively, mounted for cooperation with sound tracks 91 and 92 carried by film lengths 18 and 19, respectively. The audio pickup devices may be either of the optical or the magnetic type depending upon the nature of the sound track carried by the film lengths. Audio pickup device 89 is disposed between optical axis 78 and reel 12, whereas audio pickup device 90 is disposed along the path of film length 19 between optical axis 79 and film storage reel 11. In both cases, however, the audio pickup devices occupy the same relative position within the structure of the respective projectors such that identical commercially available projectors may be used; the difference in the relation of the pickup units to the film storage reels is attributable to the manner in which film is passed through the respective projectors.

Figure 9:
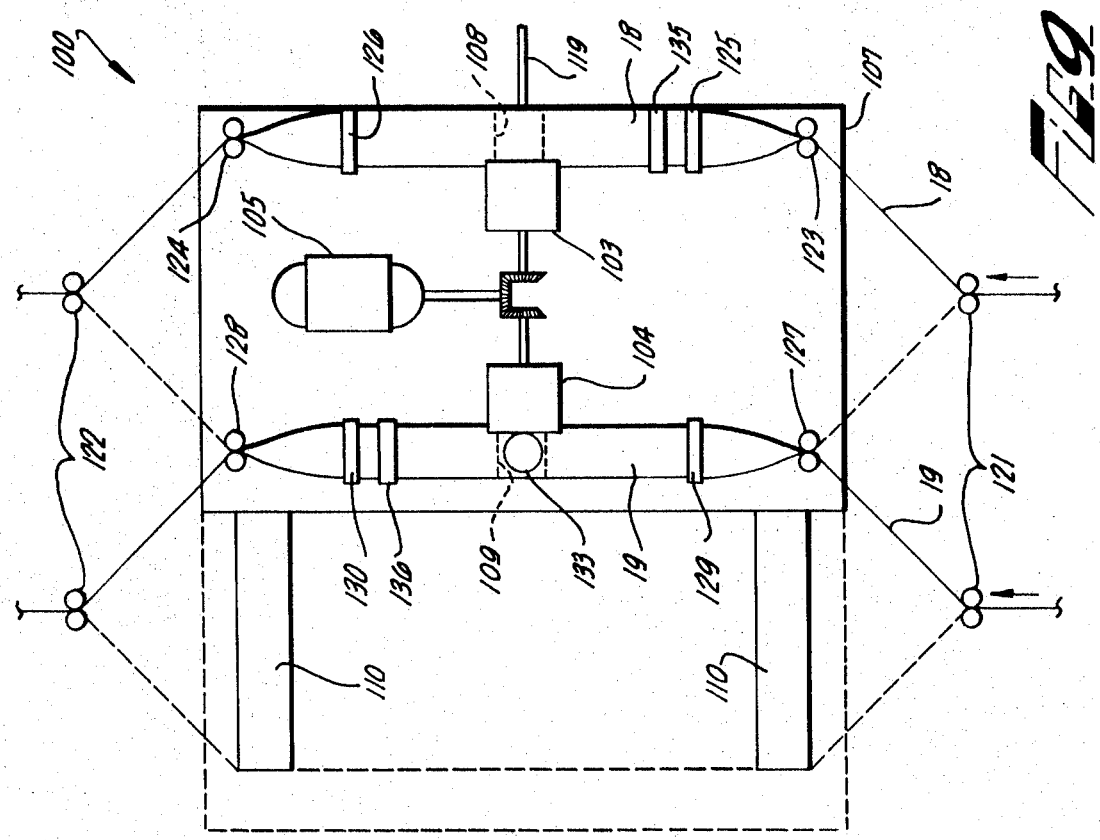
FIG. 9 is a view taken along line 9—9 in FIG. 8.

In each of the projection systems illustrated in FIGS. 1–7 and described above, the system projection means includes a projection lens assembly for each film path. FIGS. 8 and 9 are fragmentary views of another projection system 100 which has only one projection lens assembly 101 arranged along a fixed optical axis 102. As with the projection systems heretofore describe, system 100 includes a pair of film advance mechanisms 103 and 104 which cooperate with each of film lengths 18 and 19, respectively, to drive the film lengths between a pair of film storage reels (not shown, but see FIG. 1, for example) upon which the film lengths are wound in the bifilar fashion described above. The film advance mechanism are operated in response to operation of a common reversible motor 105 which is coupled to the advance mechanisms in the same manner as is illustrated in FIG. 4 relative to system 49. The film advance mechanisms and motor 105 are mounted upon a support plate 107 in such manner that the film paths adjacent the advance mechanisms are in spaced parallel coplanar relation, as shown in FIGS. 8 and 9. Further, the film advance mechanisms are disposed in back-to-back relation to each other on the plate so that the image of that frame of film length 18 which is adjacent a projection aperture 108 formed through the support plate adjacent advance mechanism 103 is perverted relative to the image presented by that frame of film length 19 which overlies a projection aperture 109 formed through the support plate adjacent advance mechanism 104. In this respect, system 100 is similar to projection systems 10, 10' and 49 described above. The support plate is movably supported on a pair of guide rails 110 which lie in a common plane parallel to the common plane of the film lengths adjacent the advance mechanisms, and which extends perpendicular to the direction in which the film lengths extend past the advance mechanisms (see FIG. 9).

The support plate is driven along guides 110 by a drive mechanism 112 which, in the exemplary arrangement shown, includes a reversible motor 113, the mode of operation of which is controlled by reversing switch 42. Motor 113 drives a pinion gear 114 which is engaged with a sector gear 115 mounted for rotation about a fixed axis 116. The sector gear defines a radial slot 117 within which is loosely engaged a pin 118. The pin is connected to one end of a connecting rod 119, the other end of which is connected to the support plate. The connecting rod extends parallel to the length of guides 110; sector gear 115 preferably lies in a plane which extends parallel to the length of the guides and is perpendicular to the common plane of the guides. Upon operation of reversing switch 42, motor 113 is operated to drive the sector gear about axis 116, thereby to move support plate 107 along guides 110 an amount equal to the spacing between film lengths 18 and 19 at the film advance mechanisms. Upon the next operation of the reversing switch, the sector gear is driven in the opposite direction to reciprocate the support plate a like amount in the opposite direction.

Outwardly of each of the opposite ends of the support plate, each of film lengths 18 and 19 pass between a pair of guide rollers 121 and 122, respectively, which are mounted for rotation about fixed axes disposed perpendicular to the support plate. A pair of guide rollers 123 are mounted to the support plate adjacent one edge thereof substantially in line with advance mechanism 103 and a similar pair of rollers 124 are mounted to the support plate adjacent its opposite edge substantially in line with the advance mechanism. Rollers 123 and 124 are rotatable about axes disposed perpendicular to the support plate. Between rollers 123 and advance mechanism 103, film length 18 engages a guide roller 125 which is disposed for rotation about an axis parallel to the support plate, and a similarly disposed guide roller 126 is mounted to the support plate between advance mechanism 103 and rollers 124. Rollers 123, 124, 125 have counterparts 127, 128, 129 and 130 which define the path of film length 19 across the support plate past film advance mechanism 104. In view of the above-described arrangement of the rollers associated with each of of the film lengths on the support plate, it is apparent that film length 18, for example, is given a 90° axial twist between rollers 123 and 125 and is given a second 90° axial twist between rollers 126 and 124, and similarly with film length 19 between rollers 127 and 129 on the one hand, and rollers 130 and 128 on the other hand. The film lengths are twisted in the same direction at corresponding locations along their film paths in view of the back-to-back mounting of the film advance mechanisms on the support plate.

Roller pairs 121 and 122, respectively, are spaced apart along lines parallel to guides 110 an amount equal to the distance which the support plate is moved linearly in response to operation of motor 113. As shown in FIG. 9, when the support plate is at one limit of its range of reciprocal movement, projection aperture 109, associated with film length 19, is centered on optical axis 102, which axis is perpendicular to the plane of the film length at the aperture. When the support plate is at its other limit of travel, projection aperture 108 occupies the position formerly occupied by aperture 109 and is centered on the optical axis of stationary lens assembly 101. A projection lamp 133 is fixedly mounted in line with optical axis 102 adjacent the side of the support plate opposite from lens assembly 101. It is apparent, therefore, that upon operation of the reversing switch in the manner described above relative to systems 10 and 10', support plate drive mechanism 112 is operated to cause the support plate to be moved to associate the stationary projection lens assembly and the stationary projection lamp with that film length which subsequently moves in a forward mode through the projection system. That is, in the process of reversal of the manner in which film lengths 18 and 19 are transferred between the pair of reels in the projection system, that film strip which is to be moved in a forward mode between the reels is effectively associated with the projection lamp and the projection lens assembly.

It will be apparent from an examination of the structure shown in FIGS. 8 and 9 in the light of the foregoing description of systems 10, 10' and 49 that a perverting lens must be associated with one or the other of film lengths 18 or 19. Accordingly, a perverting lens 134 is mounted to the support plate adjacent aperture 109 between he aperture and the lens assembly.

Film advance mechanisms 103 and 104 are arranged so that film lengths 18 and 19 move in the same direction relative to support plate 107 in response to operation of motor 105.

Rollers 121 and 122 associated with film length 18 are located along the length of guides 110 at positions which are midway between the positions occupied by rollers 123 and 124, respectively, when the support plate is located at its opposite limits of travel along the guides; rollers 121 and 122 associated with film length 19 are similarly disposed relative to rollers 127 and 128. That is, rollers 121 for film length 18 are located along the perpendicular bisector along a line between rollers 123 and 127, and similarly with rollers 122 for film length 18 relative to rollers 124 and 128. Rollers 121 and 122 for film length 19 are spaced along the length of guides 110 from the corresponding rollers for film length 18 a distance equal to the amount of reciprocal movement afforded to the support plate. Accordingly, movement of the support plate along guides 110 produces no change in the effective length of the film path between the reels for the film lengths. Preferably, motor 113 is operated while film advance mechanisms 103 and 104 are inoperative. That is, during the period of operation of motor 113, motor 105 is not operated.

Figure 10:
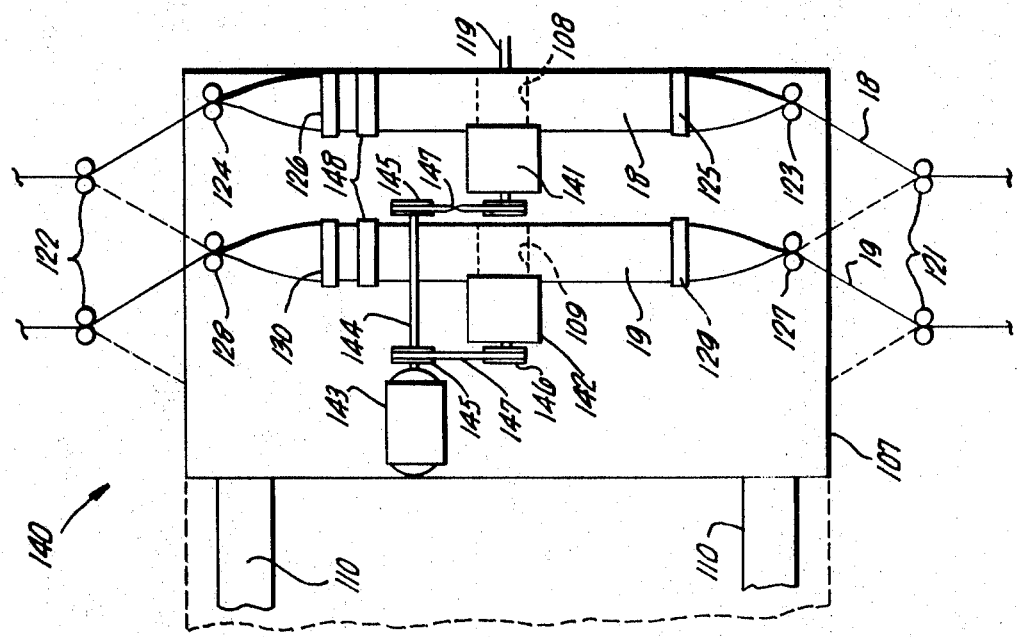
FIG. 10 is a view, similar to the view of FIG. 9, of still another projection system.

FIG. 10 is similar to FIG. 9 and illustrates another projection system 140 which bears the same relations to projection system 75 (see FIG. 6) as system 100 bears to systems 10, 10' and 49. That is, in system 100, the film lengths move in the same direction past the optical axis of the projection means of such system. In system 140, film lengths 18 and 19 move in opposite directions past the single optical axis of the projection means.

The structure of system 140, as shown in FIG. 10, is generally similar to the structure of system 100, as shown in FIG. 9, and therefore the same reference numerals are applied to the structure of system 140 as are applied to the structure of system 100 except to the extent such systems are different. Thus, projection system 140 includes a pair of film advance mechanisms 141 and 142 which are disposed in parallel relation to each other adjacent projection apertures 108 and 109, respectively, instead of back-to-back as is the case with advance mechanisms 103 and 104. Preferably, film advance mechanisms 141 and 142 are identical and are driven in opposite directions by a reversible motor 143. Motor 143 drives shaft 144 to which are mounted a pair of belt drive pulleys 145 located coplanar with drive pulleys 146 for the respective film advance mechanisms. A drive belt 147 couples each set of pulleys 145 and 146, the belt associated with advance mechanism 141 being cross-looped into a figure 8 configuration, as shown in FIG. 10, so that the film advance mechanisms are driven in opposite directions in response to operation of motor 143. While such is not shown in FIG. 10 in order that the illustration of FIG. 10 may be simplified, system 140 includes a stationary lens assembly and a stationary projection lamp which are coaxially aligned on opposite sides of the support plate in such position that, depending upon the state of a reversible drive mechanism for the support plate, one or the other of projection apertures 108 or 109 is aligned with the optical axis of the lens assembly.

In order that projection system 140 may be operated according to the same principles which are illustrated in FIG. 6, film length 18 is twisted between rollers 123 and 125 in the direction opposite to the direction in which film length 19 is twisted between rollers 127 and 129. Similarly, film length 18 is twisted between rollers 126 and 124 in a direction opposite to the direction of twist imparted to film length 19 between rollers 130 and 128. Inasmuch as film lengths 18 and 19 move in opposite directions across the support plate during operation of system 140, an audio pickup device 148 for each film length is mounted to the support plate on the same side of the optical axis of the system. In system 100, however, an audio pickup device 135 for film length 18 is located adjacent roller 125, whereas an audio pickup 136 device for film length 19 is located adjacent roller 130.

In each of the projection systems described above, it is desirable that the system, once loaded with film, not be unloaded. Thus, it is desirable that the direction of movement of the pair of film lengths through the projection system be reversed before the film lengths are completely removed from the reel rotating in a manner so as to pay out film therefrom. In order that the program to be displayed in the projection system may be changed, it is desirable to use strips of leader film which are permanently connected to the reels of the projection system. That is, with reference to FIG. 1, for example, it it is desired to change the film program defined by film lengths 18 and 19, the film lengths are connected to reel 12 by strips of leader film which are permanently secured to reel 12. The leader films have lengths adequate to extend along the respective film paths at least to adjacent the periphery of reel 11. Reel 11, therefore, may be removed from the projection system by dissociating film lengths 18 and 19 from their respective leaders and by inserting another reel in the place of reel 11 and by connecting the ends of the film lengths carried by this new reel to the adjacent ends of the leader films.

In the foregoing description of projection systems 10, 10', 49 and 75, it was stated that the two projection lens assemblies of each system are directed to a common display screen. It is within the scope of this invention that the separate lens assemblies of the projection systems may be directed to separate display screens, particularly where the projection station in the system is located in the overhead area of a commercial passenger aircraft over the passenger aisle. If both projection lens assemblies were directed to a common screen, the screen most probably would be located directly over the aisle some distance from the projection station. The presence of a display screen a such a location either tends to impede the flow of passenger traffic along the aisle or results in interference with the display of a motion picture program as passengers move along the aisle. The dual lens system feature of systems 10, 10', 49 and 75 means that it is possible to locate a display screen forwardly of each lens somewhat to the side of the passenger aisle; in such an instance only one screen need be in place as film is transferred in one direction between reels 11 and 12, for example, and the other screen would be in place during movement of film from reel 12 to reel 11. Especially in applications of this invention where each of film lengths 18 and 19 is sufficiently long to define a complete full-length motion picture, that screen associated with the program to be displayed would be lowered into place in the aircraft passenger compartment. The other screen would be left retracted to that passengers could move along the aisle during display of the program without unduly interfering with the display. On the other hand, where film lengths 18 and 19 define the first and second halves of a full-length motion picture film, the display screens could be fitted with suitable mechanism to produce lowering of only that screen which is associated with film moving in a forward mode through the projection station; upon reversal of the direction of the film lengths through the projection station, the mechanism associated with the screens would automatically lower the other screen and retract the screen used to display the first half of the program.

In applications of this invention where film lengths 18 and 19, for example, define complete motion picture programs, the projection system is capable of accommodating films initially made according to different cinematographic processes. For example, the information carried by film length 18 may have been recorded on the film according to conventional cinematographic processes such that the images recorded on the film are "flat prints." On the other hand, the images recorded on film length 19 might be associated with a wide screen motion picture, in which case the lens assembly associated with film length 19 would include an anamorphic lens.

In the foregoing description, reference has been made to switches which cooperate with the film lengths for the purposes of controlling the operation of the projection system. For the purposes of example, these switches have been shown as mechanical switches which include a follower roller engaged with at least one of the film lengths for sensing the presence of an aperture formed in the film length. It will be understood that nonmechanical switches may also be used to advantage to obtain the desired control functions. Such nonmechanical switches may be of the magnetic type responsive to the existence of a magnetized area at a selected location along at least one of the film lengths. Alternatively, the switch may be a photoelectric switch operated by a suitably transparent portion of the film.

Projection systems 49, 75, 100 and 140 have been illustrated only in part in the accompanying drawings in order that the drawings may be simplified. In the description of these systems, reference has been made to systems 10 and 10', for example. Accordingly, it should be understood that each of the systems which are only partially graphically illustrated do include a pair of supply and takeup reels upon which a pair of film lengths are wound in reciprocal head-to-tail bifilar fashion. It should also be understood that the control systems illustrated in FIGS. 1 and 7 and described in the foregoing explanation of systems 10 and 10' may be incorporated into systems 49, 75, 100 and 140, depending upon the content of the particular film program upon which it is desired that the projection system operate. In short, therefore, it should be apparent that the features described above with respect to one particular projection system, except to the extent that such features are the distinguishing features for such system, may be used to advantage in any other system without departing from the scope of this invention.

Because the two film lengths used in a projection system according to this invention are cowound in bifilar fashion on only two reels, the film lengths have equal lineal velocities adjacent the respective reels regardless of whether one film length has a greater thickness than the other. That is, the cowound bifilar arrangement of the film upon the reels renders a projection system according to this invention insensitive to differences in film thickness. As a result, such systems need not incorporate complex control mechanisms for regulating differences in film velocity due to different effective diameters of the film supply and takeup reels; in this regard, the systems comprehended by the invention have significant advantages over and are to be distinguished from the arrangements shown in U.S. Pat. Nos. 1,479,078 and 1,843,650 reviewed above. The film thickness insensitivity of the present projection systems is shown in FIG. 2. If film length 18 is thicker than film length 19, the increase in effective reel diameter for each turn of length 18 is effectively imposed upon and reflected by the diameter of the corresponding turn of film length 19. Therefore, even if length 18 is grossly thicker than length 19, the lengths will still have equal linear velocities adjacent the reel as film is either payed out from or taken onto the reel.

Commonly owned U.S. Pat. No. 3,379,488, which also pertains to a projection system having utility within commercial passenger aircraft, describes the projection of film information in opposite directions from a projection station. Such a projection feature may be realized from the present invention, in which case it may be desired to use four cowound film lengths defining two duplicate film programs, the information recorded on the two forward moving film lengths being projected in opposite directions by separate projectors located at a common projection station. Also, several cinematographic processes are known which require the projection of multiple recorded images upon a common screen or display surface. In view of these factors, this invention may be extended, without departing from the scope thereof, to cowinding a plurality, say four film lengths, in multifilar relation on a pair of reels, half of the lengths being disposed in head-to-tail relation relative to the remaining lengths. During simultaneous movement of the films between the reels, the information recorded upon at least one of the film lengths is displayed by projection means located between the reels. All film lengths moving in a forward mode at any instant may be subject to display upon separate screens or upon a common screen.

It should be readily apparent to workers skilled in the art to which this invention pertains that the invention has utility in areas other than with the cabin spaces of commercial passenger aircraft. The invention may be used to advantage in the display of motion pictures via television; in such instances, the projection means in the system may be directed to an image orthicon tube or to a vidicon tube instead of to a conventional display screen.

In summary, then, various configurations of apparatus have been described above merely for the purposes of example so that the basic teachings and utilities of the present invention may be clearly understood. These structural arrangements and usages have been selected for presentation herein principally for the purposes of example. Also, the presently preferred embodiment of this invention has been set forth in the description which pertains to FIG. 6. Workers skilled in the technology to which this invention pertains will readily appreciate that this preferred embodiment, as well as the other illustrated embodiments, may be modified without departing from the scope of this invention.

What is claimed is:

1. A motion picture record comprising a motion picture film reel, first and second lengths of motion picture film defining respectively first and second halves of a motion picture film program of desired content, the films being cowound upon the reel in reciprocal head-to-tail bifilar fashion under substantially equal and substantially uniform tension.

2. A motion picture record according to claim 1 wherein each film length has an emulsion side and the lengths are cowound upon the reel with their emulsion sides facing in a common direction relative to the reel axis.

3. A reeled motion picture record comprising a motion picture film reel, first and second lengths of motion picture film each having an emulsion side and defining respectively first and second halves of a motion picture film program of desired content, the films being cowound upon the reel in reciprocal head-to-tail bifilar fashion with their emulsion sides facing in a common direction relative to the reel axis.

4. A method of displaying a motion picture program comprising the steps of
providing first and second lengths of motion picture film which define respective halves of the program,
cowinding the film lengths in reciprocal head-to-tail bifilar relation on a first reel rotatable about a stationary axis in such manner that the head end of the first film length and the tail end of the second length are located at the outer end of the bifilar coil of film on the reel,
unreeling the first and second film lengths from the reel to move the film lengths in one direction away from the first reel and displaying the first half of the program simultaneously therewith,
rereeling the first and second film lengths in said manner upon the first reel to move the film lengths in an opposite direction toward the first reel and displaying the second half of the program simultaneously therewith, and
performing the unreeling and rereeling steps without moving the axis of the first reel.

5. A method according to claim 4 including connecting the head end of the first film length and the tail end of the second film length to a second reel rotatable about a stationary axis and cowinding the film lengths upon the second reel in reciprocal head-to-tail bifilar fashion during unreeling of the film lengths from the first reel.

6. A method according to claim 4 including moving the first and second film lengths along separate paths during the unreeling and rereeling steps, providing a single optical axis projection means along said paths, and associating the projection means with the first film length during the unreeling step, and associating the projection means with the second film length during the rereeling step.

7. A method according to claim 4 including sensing the movement of a selected portion of one of the film lengths past a selected location in the path thereof.

8. A method according to claim 7 including commencing the rereeling step in response to said sensing step.

9. A method according to claim 8 including defining said selected portion of the one film length adjacent the tail end of the first film length.

10. A method according to claim 7 including defining the selected location adjacent the periphery of the first reel.

11. A method of displaying a motion picture program comprising the steps of
providing first and second lengths of motion picture film which define respective halves of the program,
cowinding the film lengths in reciprocal head-to-tail bifilar relation on a reel in such manner that the head end of the first film length and the tail end of the second length are located at the outer end of the bifilar coil of film on the reel,
unreeling the first and second film lengths from the reel and displaying the first half of the program simultaneously therewith,
rereeling the first and second film lengths upon the reel and displaying the second half of the program simultaneously therewith, and sensing the movement of a selected portion of the first film length adjacent the head end thereof past a selected location in the path thereof.

12. A method according to claim 11 including discontinuing the rereeling step in response to said sensing step.

13. A method according to claim 11 including defining the selected location adjacent the periphery of the first reel.

14. A method of displaying a motion picture program comprising the steps of providing first and second lengths of motion picture film each of which has an emulsion side and which together define respective halves of the program, cowinding the film length in reciprocal head-to-tial bifilar relation on a reel with the emulsion sides of the film lengths facing in a common direction relative to the axis of the reel and arranged on the reel in such manner that the head end of the first length and the tail end of the second length are located at the outer end of the bifilar coil of film on the reel, unreeling the first and second film lengths from the reel and displaying the first half of the program simultaneously therewith, and rereeling the first and second film lengths upon the reel and displaying the second half of the program simultaneously therewith.

15. A method of displaying a motion picture program comprising the steps of providing first and second lengths of motion picture film which define respective halves of the program, cowinding the film lengths in reciprocal head-to-tail bifilar relation on the first reel in such manner that the head end of the first film length and the tail end of the second length are located at the outer end of the bifilar coil of film on the reel, unreeling the first and second film lengths from the film reel and displaying the first half of the program simultaneously therewith, rereeling the first and second film lengths upon the first reel and displaying the second half of the program simultaneously therewith, moving the first and second film lengths along separate paths during the unreeling and rereeling steps, providing a single optical axis projection means along said paths, and associating the projection means with the first film length during the unreeling step and with the second film length during the rereeling step, the change in association of the projection means with first and second film lengths being effected by relative movement between the projection means and the film paths.

16. A motion picture projection system comprising a pair of film storage reels, a pair of lengths of motion picture film defining respectively first and second halves of a film program engaged between the reels and wound upon the reels with essentially equal tension in bifilar reciprocal head-to-tail relation on the reels, reversible means for driving the film lengths along separate film paths from one reel to the other reel and back, projection means along both film paths and including lens means, and means effectively associating the lens means with the film length moved in a forward mode through the projection means in response to operation of the reversible means.

17. A motion picture projection system comprising a pair of film storage reels, a pair of lengths of motion picture film defining respectively first and second halves of a film program engaged between the reels and wound in bifilar reciprocal head-to-tail relation on the reels with their emulsion sides at each reel facing in a common direction relative to the reel, reversible means for driving the film lengths along separate film paths from one reel to the other reel and back, projection means along both film paths and including lens means, and means effectively associating the lens means with the film length moved in a forward mode through the projection means in response to operation of the reversible means.

18. Apparatus according to claim 17 wherein one film length is twisted relative to the other film length between one reel and the projection means and is relatively twisted between the projection means and the other reel.

19. Apparatus according to claim 18 wherein both of said twists occur in one of the film lengths.

20. Apparatus according to claim 17 wherein the lens means includes a lens assembly associated with each film length.

21. Apparatus according to claim 17 wherein the lens means defines a single optical axis along which film information carried by each film length is projected.

22. A motion picture projection system comprising first and second film storage reels each rotatable about a stationary axis, a pair of lengths of motion picture film defining respectively first and second halves of a film program engaged between the reels and wound in bifilar reciprocal head-to-tail relation on the reels, reversible means for driving the film lengths along separate film paths from the first reel to the second reel and back from the second reel to the first reel, projection means along both film paths and including lens means, and means effectively associating the lens means with the film length moved in a forward mode through the projection means in response to operation of the reversible means.

23. Apparatus according to claim 22 wherein the film lengths are wound upon the reels with essentially equal tension.

24. Apparatus according to claim 22 wherein the film lengths are wound on the reels with their emulsion sides facing in a common direction.

25. Apparatus according to claim 22 wherein the adjacent ends of the film lengths are connected to the corresponding reel at substantially a common location on the reel and the film lengths are essentially equal in length.

26. Apparatus according to claim 25 including means for guiding one film length to and from each of the reels so that the one length commences its wrap around each reel at a location spaced around the circumference of the reel from the location at which the other film length commences its wrap around the reel.

27. Apparatus according to claim 26 wherein the distance circumferentially of each reel between the locations of wrap commencement of the film lengths is effectively equal to the apparent difference in length between the film lengths when the film lengths are wound essentially only on one of the reels.

28. Apparatus according to claim 25 including means for guiding one film length to and from the reels arranged so that the apparent difference in length between the film lengths produced when both lengths are wound in said bifilar fashion essentially only upon one of the reels is distributed between the reels in proportion to the amount of film wound upon the respective reels.

29. A motion picture projection system comprising a pair of film storage reels, a pair of lengths of motion picture film of essentially equal elongate extent defining respectively first and second halves of a film program engaged between the reels and wound with essentially equal tension in bifilar reciprocal head-to-tail relation upon the reels, the adjacent ends of the film lengths being connected to the corresponding reel at substantially a common location on the reel, means for guiding one film length to and from each of the reels so that the one length commences its wrap around each reel at a location spaced around the circumference of the reel from the location at which the other film length commences its wrap around the reel, reversible means for driving the film lengths along separate film paths from one reel to the other reel and back, projection means along both film paths and including lens means, and means effectively associating the lens means with the film length moved in a forward mode through the projection means in response to operation of the reversible means.

30. Apparatus according to claim 29 wherein the distance circumferentially of each reel between the locations of wrap commencement of the film lengths is effectively equal to the apparent difference in length between the film lengths when the film lengths are wound essentially only on one of the reels.

31. A motion picture projection system comprising a pair of film storage reels, a pair of lengths of motion picture film of essentially equal elongate extent defining respectively first and second halves of a film program engaged between the reels and wound with essentially equal tension in bifilar reciprocal head-to-tail relation on the reels, the adjacent ends of the film lengths being connected to the corresponding reel at substantially a common location on the reel, means for guiding one film length to and from the reels arranged so that the apparent difference in length between the film lengths produced when both lengths are wound in said bifilar fashion essentially upon only one of the reels is distributed between the reels in proportion to the amount of film wound on the respective reels, reversible means for driving the film lengths along separate film paths from one reel to the other reel and back, projection means along both film paths and including lens means, and means effectively associating the lens means with the film length moved in a forward mode through the projection means in response to operation of the reversible means.

32. A motion picture projection system comprising a pair of film storage reels, a pair of lengths of motion picture film defining respectively first and second halves of a film program engaged between the reels and wound in bifilar reciprocal head-to-tail relation on the reels, reversible means for driving the film lengths along separate film paths from one reel to the other reel and back, projection means along both film paths and including lens means defining a single optical axis along which information carried by the film lengths is projected, and means effectively associating the lens means with the film length moved in a forward mode through the projection means in response to operation of the reversible means and including drive means operable to produce relative movement between the film paths and the optical axis, the drive means being arranged to cause the lens means optical axis to intersect the path of the first film length in a first condition thereof and go cause the optical axis to intersect the path of the second film length in a second condition thereof.

33. Apparatus according to claim 32 including a support, wherein the reversible means includes a film advance mechanism for each film length mounted on the support and arranged so that the film paths at the advance mechanisms are in spaced parallel and coplanar relation to each other, and the drive means is operable for moving the support perpendicularly of the film paths an amount equal to the spacing between the paths.

34. Apparatus according to claim 33 including an image perverting lens mounted to the support in cooperation with one of the film paths.

35. Apparatus according to claim 33 wherein the advance mechanisms are arranged so that the film lengths are moved in the same direction relative to the support in response to operation thereof.

36. Apparatus according to claim 33 wherein the advance mechanisms are arranged so that the film lengths move in opposite directions relative to the support in response to operation thereof.

37. Apparatus according to claim 32 including guide means for guiding the film lengths along spaced parallel paths adjacent the lens means.

38. Apparatus according to claim 37 wherein the optical axis is stationary, and the drive means is effective to move the film paths.

39. Apparatus according to claim 38 wherein the guide means is arranged so that the effective lengths of the film paths between the reels are essentially equal to both conditions of the drive means.

40. A motion picture system comprising
a pair of film storage reels,
a pair of lengths of motion picture film defining respectively first and second halves of a film program engaged between the reels and wound in bifilar reciprocal head-to-tail relation on the reels,
reversible means for driving the film lengths along separate film paths from one reel to the other reel and back,
projection means along both film paths comprising a pair of motion picture projectors each having a film advance mechanism, a lens system and an audio pickup device, all disposed on a projector base plate in an arrangement identical to the arrangement of the corresponding components of the other projector, and
means for illuminating the lens system of the projector associated with the film length moved in a forward mode between the reels in response to operation of the reversible means.

41. Apparatus according to claim 40 wherein each projector includes a drive motor for the film advance mechanism thereof.

42. Apparatus according to claim 40 including a single motor for driving the film advance mechanisms of the projector.

43. Apparatus according to claim 40 wherein each projector includes a projection lamp.

44. Apparatus according to claim 40 including a single projection lamp common to the lens systems of both projectors.

45. A motion projector system comprising first and second film storage reels each rotatable about a stationary axis, a pair of lengths of motion picture film defining respectively first and second halves of a film program engaged between the reels and wound in bifilar reciprocal head-to-tail relation on the reels, reversible means for driving the film lengths along separate film paths from the first reel to the second reel and back from the second reel to the first reel, projection means along both film paths and including a projection lens system associated with each film path, and means for illuminating the lens system associated with the film length moved in a forward mode through the projection means in response to operation of the reversible means.

46. Apparatus according to claim 45 wherein the lens systems are directed to a common display screen.

47. A motion picture projection system comprising a air of film storage reels, a pair of lengths of motion picture film defining respectively first and second halves of a film program engaged between the reels and wound in bifilar reciprocal head-to-tail relation on the reels, reversible means for driving the film lengths along separate film paths from one reel to the other reel and back, projection means along both film paths and including a projection lens system associated with each film path, and means for illuminating the lens system associated with the film length moved in a forward mode through the projection means in response to operation of the reversible means, one lens system per se of the projection means being arranged to project an image which is perverted relative to the image projected by the other lens system per se.

48. A motion picture projection system comprising a pair of film storage reels, a pair of lengths of motion picture film defining respectively first and second halves of a film program engaged between the reels and wound in bifilar reciprocal head-to-tail relation on the reels, reversible means for driving the film lengths along separate film paths from one reel to the other reel and back, projection means along both film paths and including a projection lens system associated with each film path, and means for illuminating the lens system associated with the film length moved in a forward mode through the projection means in response to operation of the reversible means, the lens systems and the film paths being cooperatively arranged so that during operation of the reversible means the film lengths traverse the optical axes of the lens systems in the same direction.

49. A motion picture projection system comprising a pair of film storage reels, a pair of lengths of motion picture film defining respectively first and second halves of a film program engaged between the reels and wound in bifilar reciprocal head-to-tail relation on the reels with their emulsion sides at each reel facing in a common direction relative to the reel, reversible means for driving the film lengths along separate film paths from the one reel to the other reel and back, projection means along both film paths and including in association with each film path a projection lens system each of which is essentially identical to the other lens system, means for illuminating the lens system associated with the film length moved in a forward mode through the projection means in response to operation of the reversible means, one film length being twisted 180° relative to the other film length between one reel and the optical axis of the lens system associated therewith and being relatively twisted 180° between said optical axis and the other reel.

50. A motion picture projection system comprising first and second film storage reels each rotatable about a stationary axis, a pair of lengths of motion picture film defining respectively first and second halves of a film program engaged between the reels and wound in bifilar reciprocal head-to-tail relation on the reels, reversible means for driving the film lengths along separate film paths from the first reel to the second reel and back from the second reel to the first reel, projection means along both film paths and including a projection lens system associated with each film path, and means for illuminating the lens system associated with the film length moved in a forward mode through the projection means in response to operation of the reversible means, the lens systems and the film paths being cooperatively arranged so that during operation of the reversible means the film lengths traverse the optical axes of the lens systems in opposite directions.

51. Apparatus according to claim 50 wherein the film paths are so arranged that the emulsion sides of the film lengths face in the same direction along the optical axes of the lens systems.

52. A motion picture projection system comprising a pair of film storage reels, a pair of lengths of motion picture film defining respectively first and second halves of a film program engaged between the reels and wound in bifilar reciprocal head-to-tail relation on the reels, reversible means for driving the film lengths along separate film paths from one reel to the other reel and back, reversing means for controlling the operational mode of the reversible means and including means for generating a signal upon movement of a selected terminal part of at least one of the film lengths past a selected location in the path thereof, projection means along both film paths and including lens means, and means operable in response to the reversing means for effectively associating the lens means with the film length moved in a forward mode through the projection means by the reversible means.

53. Apparatus according to claim 52 including means responsive to the signal for discontinuing operation of the system.

54. Apparatus according to claim 52 wherein the reversible means includes a film advance mechanism for each film length and reversible motor means for driving the film advance mechanisms, and the reversing means is operatively coupled to the motor means for reversing the motor means in response to said signal.

55. Apparatus according to claim 54 wherein the motor means comprises a reversible drive motor for each film advance mechanism.

56. Apparatus according to claim 54 wherein the motor means consists of a reversible motor common to both film advance mechanisms.

57. Apparatus according to claim 52 wherein the lens means includes a lens system for each film path, and including projection lamp means disposed for illuminating the lens systems, and the effectively associating means is operable for selecting for illumination by the lamp means that lens system associated with the film length moving in a forward mode therepast.

58. Apparatus according to claim 57 wherein the projection lamp means comprises a projection lamp for each lens system.

59. Apparatus according to claim 57 wherein the projection lamp means comprises a single lamp common to both lens systems, and means responsive to said signal for shuttering light emitted by the lamp between the lens systems.

60. Apparatus according to claim 57 wherein the projection lamp means comprises a single lamp common to both lens systems, light mask means disposed between the lamp and the lens systems, and means operable alternately in response to said signal for masking light from one lens system and for passing light to the other lens system.

61. Apparatus for displaying information recorded on motion picture film comprising a pair of film storage reels each rotatable about a stationary axis, a pair of lengths of motion picture film defining respectively first and second serial portions of a film program engaged between the reels and wound in bifilar reciprocal head-to-tail relation on the reels, drive means for driving the film lengths along separate film paths between the reels for transferring said film lengths from one reel to the other, means along the film paths between the reels operative to display film information carried by the film length moved in a forward mode between the reels in response to operation of the drive means, and means operative in response to transfer of essentially all of the film defining said lengths from the one reel to the other for reversing the drive means to transfer said film lengths from the other reel back to the one reel and to move film in an opposite direction past the display means.

* * * * *

PO-1050
(5/69)

UNITED STATES PATENT OFFICE
CERTIFICATE OF CORRECTION

Patent No. 3,617,117     Dated November 2, 1971

Inventor(s) Patrick Michael Powers

It is certified that error appears in the above-identified patent and that said Letters Patent are hereby corrected as shown below:

Column 2, line 71 -- For "mechanism" read --mechanisms--.

Column 7, line 21 -- For "button" read --bottom--.

Column 8, line 17 -- For "projections" read --projectors--.

Column 10, line 52-- For "he" read --the--.

Column 11, line 58-- For "to" (first occurrence) read --so--;

line 63-- For "it" (first occurrence) read --if--.

Column 12, line 9-- For "a" (first occurrence) read --at--;

line 24-- For "to" read --so--.

Column 15, line 13-- For "tial" read --tail--;

line 49-- Before "first" and after "with", insert --the--.

Column 17, line 38-- For "go" read --to--;

line 68-- For "to" read --in--.

Column 18, line 23-- For "projector" read --picture projection--;

line 39-- For "air" read --pair--.

Signed and sealed this 18th day of July 1972.

(SEAL)
Attest:

EDWARD M. FLETCHER, JR.          ROBERT GOTTSCHALK
Attesting Officer                  Commissioner of Patents